(12) United States Patent
Ramarao et al.

(10) Patent No.: US 7,941,417 B2
(45) Date of Patent: May 10, 2011

(54) PROCESSING STRUCTURED ELECTRONIC DOCUMENT STREAMS USING LOOK-AHEAD AUTOMATA

(75) Inventors: Karempudi Ramarao, San Ramon, CA (US); Krishna Sankar, San Jose, CA (US); Stanley Poon, Fremont, CA (US); Ramakrishna Reddy Kandula, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 358 days.

(21) Appl. No.: 11/971,794

(22) Filed: Jan. 9, 2008

(65) Prior Publication Data

US 2009/0177669 A1    Jul. 9, 2009

(51) Int. Cl.
*G06F 17/30*    (2006.01)
(52) U.S. Cl. ........................................ 707/706; 707/634
(58) Field of Classification Search .................. 707/756, 707/778, 786, 797, 802, 829, 634, 706, 723, 707/726, 748, 781, 791, 793, 810, 800
See application file for complete search history.

(56) References Cited

U.S. PATENT DOCUMENTS

| | | | | |
|---|---|---|---|---|
| 7,461,074 | B2 * | 12/2008 | Murthy et al. | 707/101 |
| 7,624,075 | B2 * | 11/2009 | Lucco et al. | 706/12 |
| 7,627,570 | B2 * | 12/2009 | Bosloy et al. | 1/1 |
| 2005/0273450 | A1 * | 12/2005 | McMillen et al. | 707/1 |
| 2007/0022105 | A1 | 1/2007 | Roux | |

OTHER PUBLICATIONS

Diao, Y., et al., Path Sharing and Predicate Evaluation for High-Performance XML Filtering. Published by University of California, Berkeley. Apr. 2004. pp. 1-47. Retrieved on [Sep. 18, 2008]. Retrieved on the Internet: <URL: http://www.cs.berkeley.edu/~franklin/Papers/YfilterTODS.pdf>. Berkeley, California, USA.
Geneves, P., et al., Compiling XPath into a State-less Forward-only Subset. IBM T.J. Watson Research Center. Published by Web Adaption Multimedia. May 2004. pp. 1-7. Retrieved on [Sep. 18, 2008]. Retrieved on the Internet: <URL: http://wam.inrialpes.fr/publications/2004/GenevesRose.pdf>.

* cited by examiner

*Primary Examiner* — Khanh B Pham
*Assistant Examiner* — Reza Hosseini
(74) *Attorney, Agent, or Firm* — Hickman Palermo Truong & Becker LLP

(57) ABSTRACT

In an embodiment, an XPath automaton with state look-ahead capability can efficiently determine whether XML documents, received in a stream in serialized form in a network element, match any of a set of XPath expressions. A token processor receives a structured electronic document in serialized format and identifies entities. A name recognition engine recognizes names of elements of the document and recognizes names of attributes of the elements. A finite state automaton comprises states and transitions representing structural relationships among elements and attributes of structured path expressions and state look-ahead logic that is configured to output a final state when an entity matches one or more of the structured path expressions. The automaton performs state transitions resulting in reaching a specified final state if a match to an expression occurs.

18 Claims, 10 Drawing Sheets

US 7,941,417 B2

PROCESSING STRUCTURED ELECTRONIC DOCUMENT STREAMS USING LOOK-AHEAD AUTOMATA

TECHNICAL FIELD

The present disclosure generally relates to processing electronic messages that are carried over networks. The disclosure relates more specifically to determining expressions that the messages satisfy.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Computer networks can be used to transport electronic messages of various kinds and using various techniques. Some messages carry structured electronic documents. An example of a structured electronic document is an extensible markup language (XML) document. XML documents can be carried in network messages using stream data transmission.

At a receiving node, there is a need to determine characteristics of an arriving streamed XML message so that other data processing can be performed on the message based on the characteristics. Characteristics of the messages can be identified using an expression language known as Xpath. In systems that use large numbers of Xpath expressions and that process large volumes of XML messages, presently known methods for determining which Xpath expressions the documents satisfy are typically slow and inefficient.

SUMMARY OF THE INVENTION

The invention is summarized in the claims that are set forth at the end of this patent document.

DETAILED DESCRIPTION

Figure 1A:
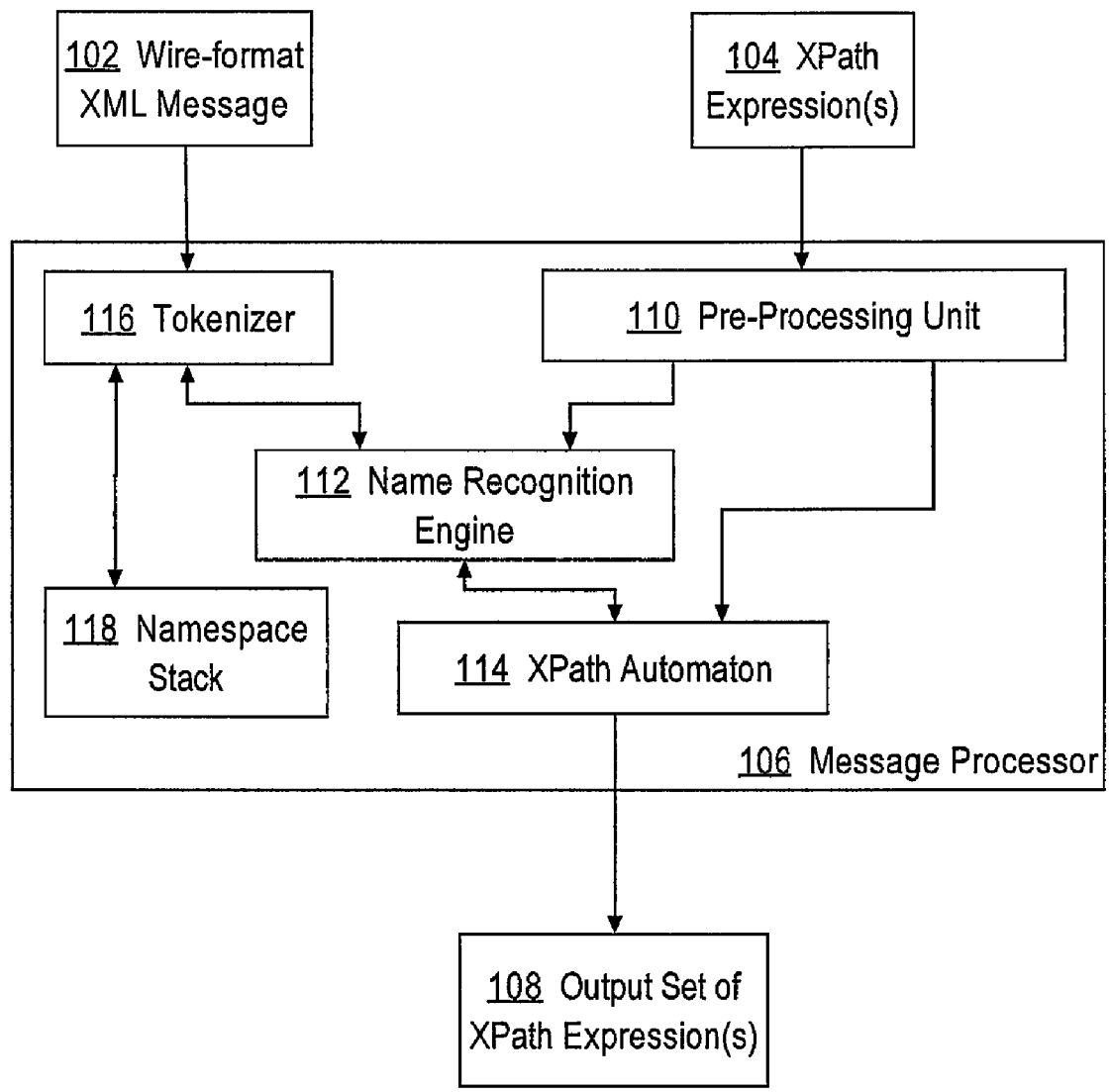
FIG. 1A is a block diagram of a message processor in one embodiment.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

1.0 Overview
    2.0 Description of Detailed Example
    2.1 Creating Data Structures and Automaton
    2.1.1 Operation of Name Recognition Engine to Construct Name Recognition Tree from Expression Set
    2.1.2 Creating an Automaton
    2.1.2.1 Creating an XPath Automaton Using the Expression Set
    2.1.2.2 Extending the XPA to Include Predicates
    2.2 Runtime Processing
    2.2.1 Tokenization
    2.2.2 Operation of XPath Automaton with Look-Ahead Approach
    2.3 Alternative Embodiments
    2.3.1 Alternatives for Name Recognition Engine
    2.3.2 Alternatives for XPA

1.0 OVERVIEW

In an embodiment, a data processing system comprises a token processor configured to receive data comprising a structured electronic document in serialized format and to identify one or more entities in the data; a name recognition engine configured to recognize one or more names of elements of a structured electronic document and to recognize one or more names of attributes of the elements; a finite state automaton comprising states and transitions representing structural relationships among elements and attributes of one or more structured path expressions and state look-ahead logic that is configured to output a final state when one or more of the entities matches one or more of the structured path expressions; logic encoded in one or more computer-readable storage media for execution and when executed by one or more processors operable to receive one or more messages comprising the structured electronic document in serialized format, provide the messages to the token processor, and receive one or more entities that have been identified in the one or more messages; provide the one or more entities to the name recognition engine to result in identifying one or more identified entities; provide the identified entities to the automaton and operating the automaton in one or more state transitions resulting in reaching the final state of the automaton; and output the final state of the automaton.

In an embodiment, the logic is further configured to instruct the token processor to cease processing a particular portion of one of the messages when the state transitions indicate that the particular portion cannot match any one of the structured path expressions.

In an embodiment, the structured electronic document is an extensible markup language (XML) document and wherein the structured path expressions are XPath expressions.

In an embodiment, the name recognition engine comprises a data table and a tree, wherein rows in the data table correspond to names of elements or attributes in the structured electronic document, wherein columns in the data table correspond to characters of the names, wherein a column rank of each column comprises a maximum number of times that one of the characters occurs in that column, wherein the tree comprises a root node corresponding to a character position in the names and associated with one of the columns having a lowest column rank.

In an embodiment, the logic is further configured to walk the tree to seek a match for a name of a specified entity among the one or more entities, by: selecting a letter in a position specified by a label of the root node and comparing the selected letter to other letters that label links to child node; determining that specified entity's name is of no interest if the specified entity's name matches none of the other letters; traversing a link labeled by the letter when there is a match; upon reaching a leaf node, comparing all remaining letters and determining a match.

In an embodiment, the transitions of the automaton correspond to "child of" and "descendent of" structural operators in the structured electronic document.

In an embodiment, the automaton comprises one or more branches corresponding to predicates within the structured path expressions.

In an embodiment, the automaton comprises a tree having a sub tree corresponding to a predicate within one of the structured path expressions, wherein the sub tree is rooted at a node with the predicate.

In an embodiment, the sub tree comprises a plurality of branches corresponding to conditions of the predicate, wherein the branches are associated with an aggregation operator representing how to combine the conditions of the predicate.

In an embodiment, a data processing method comprises receiving wire-format XML messages and a set of XPath expressions as input. After processing, the method outputs, for each XML message, the subset of XPath expressions that are satisfied by the messages.

In an embodiment, an XPath automaton with state look-ahead capability can efficiently determine whether XML documents, received in a stream in serialized form in a network element, match any of a set of XPath expressions. A token processor receives a structured electronic document in serialized format and identifies entities. A name recognition engine recognizes names of elements of the document and recognizes names of attributes of the elements. A finite state automaton comprises states and transitions representing structural relationships among elements and attributes of structured path expressions and state look-ahead logic that is configured to output a final state when an entity matches one or more of the structured path expressions. The automaton performs state transitions resulting in reaching a specified final state if a match to an expression occurs.

FIG. 1A is a block diagram of a message processor in one embodiment. A message processor 106 is coupled to and receives one or more wire-format XML messages 102 and one or more XPath expressions 104. In alternative embodiments, messages 102 may comprise other kinds of structured documents or messages, such as HTML, SGML, VRML, or other electronic documents that have a defined structure. Further, expressions 104 may comprise other forms of regular expressions or syntactic definitions. Thus, while XML and XPath are convenient for describing one clear example herein, embodiments are not limited to the use of XML and Xpath.

In an embodiment, expressions 104 are coupled to a pre-processing unit 110 that is coupled to a name recognition engine (NRE) 112 and an XPath automaton (XPA) 114. The pre-processing unit 110 comprises logic, software elements, circuits or a combination that can receive the expressions 104 and configure the name recognition engine 112 to recognize syntactic entities within the messages 102. The pre-processing unit 110 also comprises logic, software elements, circuits or a combination that can configure the XPath automaton 114 with states and state transitions that will cause the automaton to reach one of a plurality of final states when one of the expressions matches a recognized entity of the message. The XPath automaton is further configured to generate an output set 108 of expressions that match the recognized entity.

In an embodiment, messages 102 are coupled to a tokenizer 116 in the message processor 106 that is configured to receive the messages, identify tokens in the messages in a streaming manner, and output complete entities that message tokens represent. The tokenizer 116 is coupled to the name recognition engine 112 and can provide tokenized entities to the NRE for recognition. The tokenizer 116 maintains a namespace stack 118 and associates the appropriate namespace to each element name that is captured.

Figure 1B:
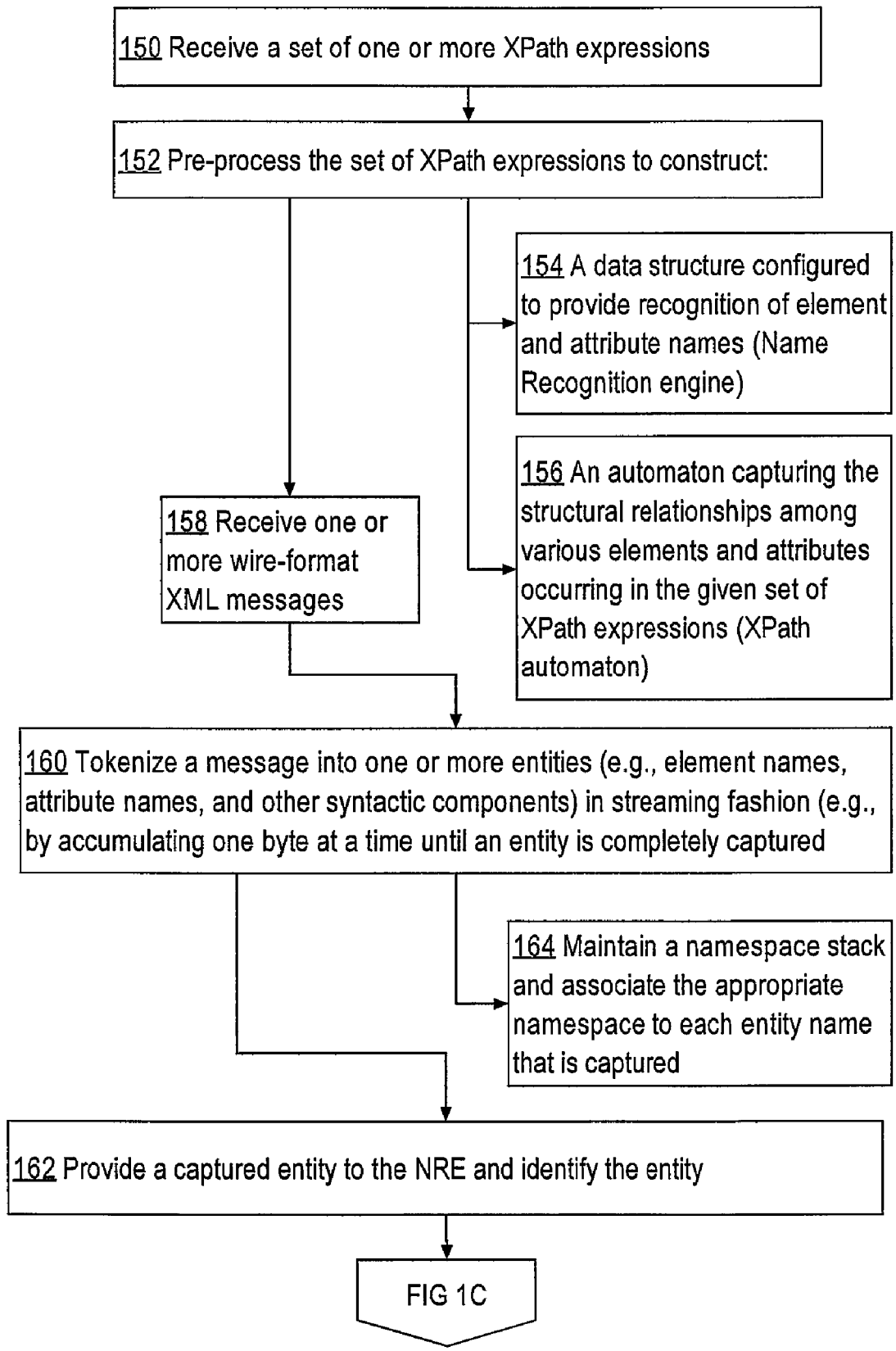
FIG. 1B illustrates a process of pre-processing expressions and identifying entities.
Figure 1C:
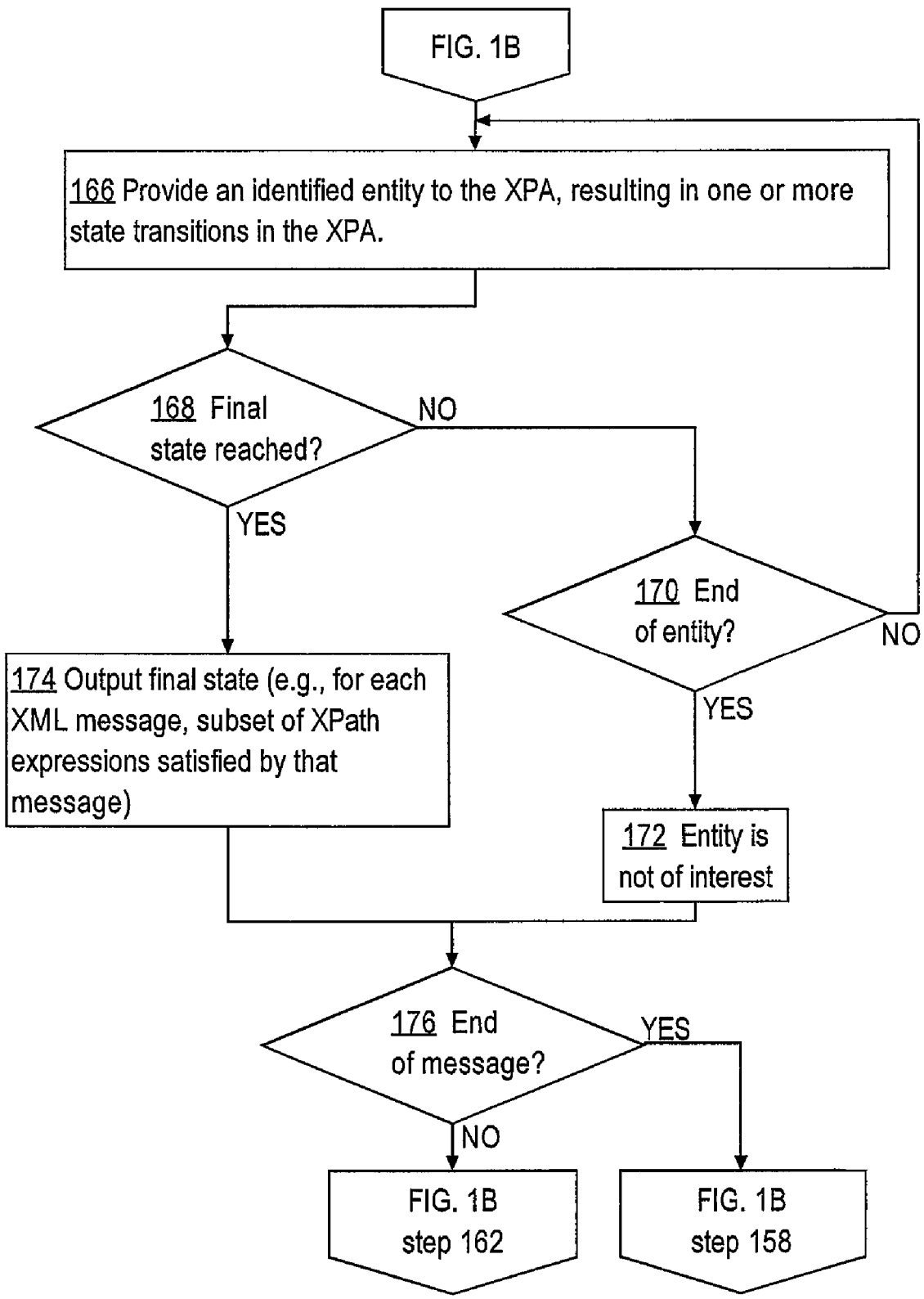
FIG. 1C illustrates further steps in a process of identifying matching expressions and outputting the expressions using a look-ahead automaton.

FIG. 1B illustrates a process of pre-processing expressions and identifying entities. FIG. 1C illustrates further steps in a process of identifying matching expressions and outputting the expressions using a look-ahead automaton. Referring first to FIG. 1B, in an embodiment, a data processing method comprises receiving a set of one or more XPath expressions as input at step 150. At step 152 the method pre-processes the set of XPath expressions to construct a data structure for fast recognition of element and attribute names, as indicated in step 154. The data structure may be termed a Name Recognition Engine or NRE. The method also constructs a finite state automaton capturing the structural relationships among various elements and attributes occurring in the given set of XPath expressions, as shown at step 156. The automaton may be termed an XPath automaton or XPA. The preceding steps may be performed as preparatory steps in advance of processing messages in real time.

One or more wire-format or serialized XML messages are received at step 158. In an embodiment, when a message is received, the process tokenizes the message into element names, attribute names, and other syntactic components in a streaming fashion, as shown at step 160. For example, the process accumulates one byte at a time until an entity is completely captured. In this description, the term "entity" refers to an element, attribute, or other part of the message. As indicated at step 164, the process maintains a namespace stack and associates the appropriate namespace to each element or attribute that is captured.

At step 162, in response to capturing an entity, the entity is run through the NRE, resulting in identifying the entity.

Referring now to FIG. 1C, in step 166, in response to identifying an entity, the entity is run through the XPA. Processing the entity results in one or more state transitions in the XPA. If a final state is reached due to such transition, as tested at step 168, then the process outputs the final state of the XPA. The final state comprises, for each message, a subset of expressions that the message satisfies.

The process may repeat for other entities until the entire message is received and processed. For example, if the final state is not reached at step 166, 168, then a test is performed at step 170 to determine whether the end of the entity has been reached within the XPA. If not, then XPA state transition processing continues. If the entity has been fully processed using the XPA without reaching a final state, then the entity is not of interest and will not match any expression, as indicated at step 172.

At step 176, a test is performed to determine if the entire message has been processed. If so, then control transfers to step 158 of FIG. 1B to process another message. Alternatively, control can transfer to another process or unit. If the end of message has not been reached, then control transfers to step 162 of FIG. 1B to process additional entities within the current message.

2.0 DESCRIPTION OF DETAILED EXAMPLE

2.1 Creating Data Structures and Automaton

The detailed example described in the present sections is organized in two major sections. Section 2.1 provides a description of data structures and an XPath automaton that may be created or established in pre-processing steps prior to processing messages in a network element. Section 2.2 describes runtime processing of messages as the messages arrive in the network element, using the data structures and automaton that were previously established.

2.1.1 Operation of Name Recognition Engine to Construct Name Recognition Tree from Expression Set In an embodiment, when a message is received, the process tokenizes the message into element names, attribute names, and other syntactic components in a streaming fashion. Tokenization may be implemented using presently available software libraries that serve as a Tokenizer. An example is available at the time of this writing from the Internet site xmltokenizer.com. As an entity is captured by the Tokenizer, the process herein is configured to identify the entity. The set of XPath expressions S completely describes the set of entities of interest to the process; thus, any element or attribute name that the Tokenizer identifies, but not occurring in some XPath in S, is unimportant in processing the message. Such an entity is not ignored, but the process does not have to know specifically what entity it is. For instance, an example XPath expression may be: /*//*@attribute1=x. For this example, the only entity of interest is the attribute with name "attribute 1". The name of the element for which this is an attribute is of no specific interest, but the fact that such an element exists is and its relationship to some other non-specific elements also is of interest.

Identifying whether an entity is of interest is a complex problem, because entities usually comprise large alphanumeric names, having an average length of about 10. Thus, simple techniques such as binary search over the ordered table of all entities in S, or hash table-based searches, take many cycles to identify an entity. The namespace also contributes to processing cost, because the namespace names typically are uniform resource locators (URLs) and tend to be long, on the order of 20-50 characters. However, embodiments can process entity names and namespace names of any length, and the specific lengths identified in this paragraph are not required and are not limitations on the approach herein.

In an embodiment, a computer-implemented process constructs two tree structures denoted a Namespace Name Recognizer (NNR) and an Entity Name Recognizer (ENR), using the same technique. The technique for constructing the tree structures is now described in the context of an example. The following example, and each other example in this description, is provided merely to enhance the clarity of the description, but the specific information in each example is not required and is not a limitation on the approach herein. Assume that the following list of names is known, for example, from a "library" XML file: catalog, book, author, title, genre, price, publish_date, description. In an embodiment, the letters of these names are arranged into a table as set forth in TABLE 1.

TABLE 1

EXAMPLE LETTER TABLE

| C | A | T | A | L | O | G |   |   |   |   |   |
|---|---|---|---|---|---|---|---|---|---|---|---|
| B | O | O | K |   |   |   |   |   |   |   |   |
| A | U | T | H | O | R |   |   |   |   |   |   |
| T | I | T | L | E |   |   |   |   |   |   |   |
| G | E | N | R | E |   |   |   |   |   |   |   |
| P | R | I | C | E |   |   |   |   |   |   |   |
| P | U | B | L | I | S | H | _ | D | A | T | E |
| D | E | S | C | R | I | P | T | I | O | N |   |

For each letter in the table, the process assigns the number of times that the letter occurs in its column, a value termed the letter rank. The process also finds the maximum letter rank value for each column, which is denoted the column rank. TABLE 2 illustrates the letter values of Table 1 with a letter rank for each letter value, and the last row of Table 2 indicates column rank values for each column.

TABLE 2

LETTERS WITH LETTER RANK VALUES

| $C_1$ | $A_1$ | $T_3$ | $A_1$ | $L_1$ | $O_1$ | $G_1$ |   |   |   |   |   |
|---|---|---|---|---|---|---|---|---|---|---|---|
| $B_1$ | $O_1$ | $O_1$ | $K_1$ |   |   |   |   |   |   |   |   |
| $A_1$ | $U_2$ | T | $H_1$ | $O_1$ | $R_1$ |   |   |   |   |   |   |
| $T_1$ | $I_1$ | T | $L_2$ | $E_3$ |   |   |   |   |   |   |   |
| $G_1$ | $E_2$ | $N_1$ | $R_1$ | E |   |   |   |   |   |   |   |
| $P_2$ | $R_1$ | $I_1$ | $C_2$ | E |   |   |   |   |   |   |   |
| P | U | $B_1$ | L | $I_1$ | $S_1$ | $H_1$ | $\_1$ | $D_1$ | $A_1$ | $T_1$ | $E_1$ |
| $D_1$ | E | $S_1$ | C | $R_1$ | $I_1$ | $P_1$ | $T_1$ | $I_1$ | $O_1$ | $N_1$ |   |
| 2 | 2 | 3 | 2 | 3 | 1 | 1 | 1 | 1 | 1 | 1 | 1 |

The process next determines which column has the smallest rank column rank value. If there are multiple such columns, the first column is selected as the pivot column. In the example of Table 2, column 6 becomes the pivot column because it is the first column, working from left to right, that has the smallest column rank value of "1".

Figure 2:
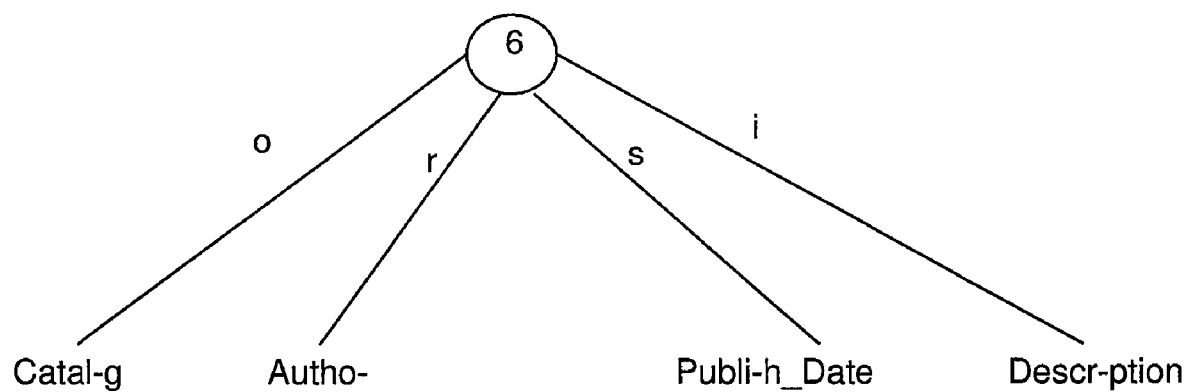
FIG. 2 illustrates an example Name Recognition Tree constructed using the preceding process based on the data of Table 2.

The process next constructs a Name Recognition Tree or NRT iteratively as follows. Starting with the pivot column number as the label of the root node, the process creates as many child nodes as the unique letters in that column. The links from a parent node to a child node are labeled using each of the unique letters. For each of the unique letters having a letter rank of more than one, the process creates as many child nodes as the letter rank. For one such node, the process selects the rows from the table that correspond to the multiple occurrences of the letter, forms a table as in Table 2 using just the selected rows, and continues the process. The process next labels the node with the new pivot column number. FIG. 2 illustrates an example Name Recognition Tree constructed using the preceding process based on the data of Table 2.

In this example, none of the letters labeling the links to the children of the root node has a rank above 1. Each of these leaf nodes is labeled with the remaining letters of the corresponding row instead.

At run time, when an entity is captured, the process traverses the NRT testing for a match for the name of that entity, by choosing the letter in the position given by the label of the root node and comparing it to the letters labeling the links to its children. If the name of the entity does not match any of the letters labeling the links to the child nodes, then the entity is of no interest. When a match occurs, the process traverses the link labeled by the matching letter. When the process reaches a leaf node, the process compares all the remaining letters to determine if a complete match exists.

The described technique has a better performance than a hash approach. In one hash approach, each character in an entity is used at least once to compute the hash function, which is sufficient if the corresponding hash bucket is empty. If not, then at least one comparison is made between each character of the entity and the corresponding character of the name in the hash table, in the best case when there is exactly one item in the bucket. In the approach herein, each character is compared exactly once. Techniques such as direct indexing can be used when a node has a large number of children, so that the cost of a comparison is kept small, at the possible expense of some memory space. Furthermore, the depth of an NRT tends to be small in most practical scenarios.

More efficient implementations of the above-described approach are possible when multiple characters are chosen at once for comparison, as opposed to a single character as described above. However, the computational effort in finding such character combinations grows rapidly with the number of characters that are grouped, and is not worth the effort in most cases. In general, the problem of finding if an NRT of depth exactly 1 exists for a given set of alphanumeric strings is NP-complete. Thus, the above-described approach is a practical heuristic that leads to efficient NRT structures.

In an embodiment, two instances of a Name Recognition Engine implement the preceding process; a first NRE processes namespace names and a second NRE processes element and attribute names. In an embodiment, the element names are not separated from the attribute names because the element names tend to be distinct. If the element names are not distinct, or there is much commonality, then an element name NRT and a separate attribute name NRT may be used.

2.1.2 Creating an XPath Automaton (XPA)

2.1.2.1 Creating an XPath Automaton Using the Expression Set

Although XPath expressions may contain namespace names, element names, attribute names and other items, processing efficiency is achieved by not processing long alphanumeric strings at run-time. In an embodiment, the process substitutes integers for the names and uses these numbers as synonymous with the names in identifying XPath expressions satisfied by an XML message. This approach is usable in part because only the names that appear in the expression set S are of interest. Thus, when the name of a captured entity matches an NRT as described above, the output from the NRT may be the integer that represents the name. The mapping of a name to an integer is arbitrary; in an embodiment, sequential numbers are assigned to the names occurring in the XPath expressions in S. The order in which the XPath expressions are considered for this purpose is not important.

A finite state automaton that can be used in an embodiment is now described in the context of an example, and the example approach is also to known NFA and DFA approaches. Assume that the expression set S comprises seven (7) XPath expressions:

/a/b

/a/c

/a/b/c

/a//b/c

/a/*/c

/a//c

/a/*/*/c

Figure 3:
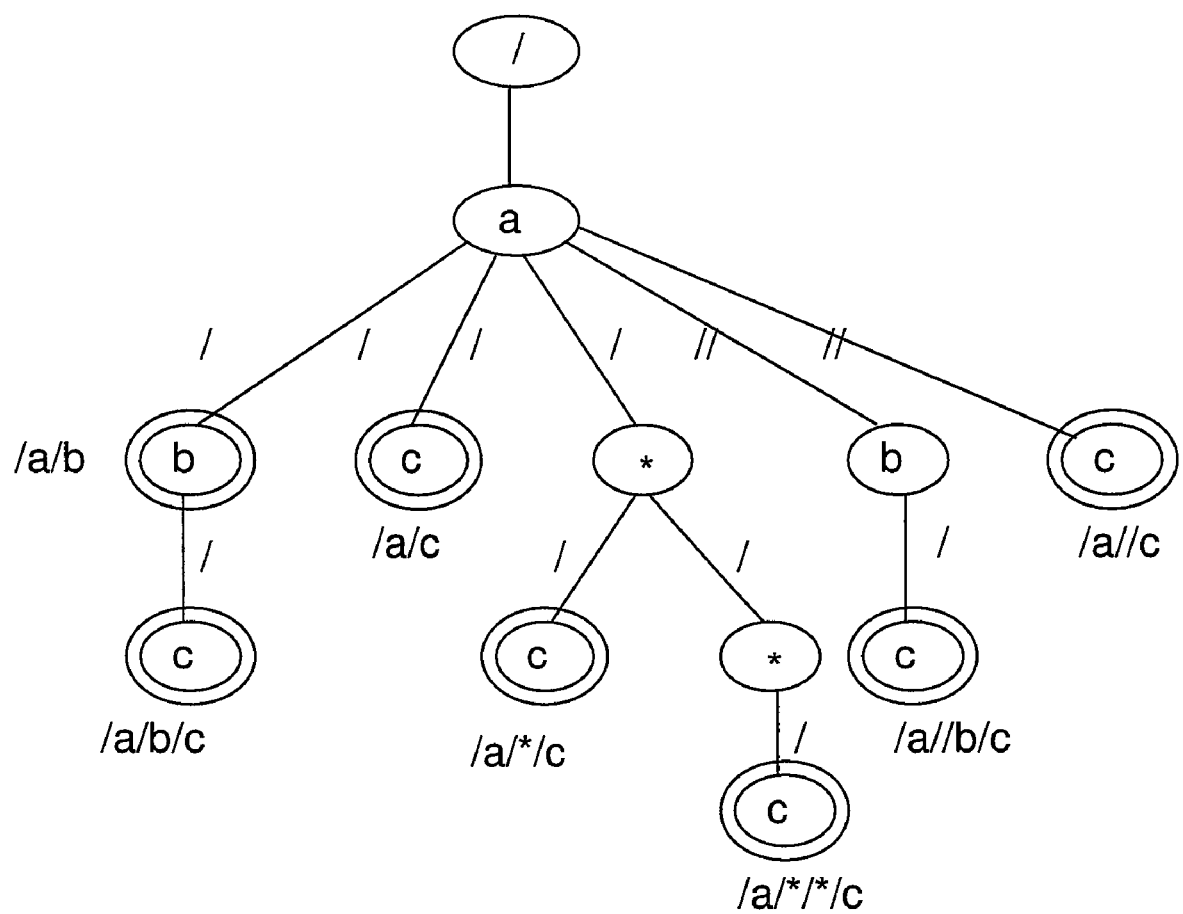
FIG. 3 illustrates an automaton that is implemented according to the present approach.

FIG. 3 illustrates an automaton that is implemented according to the present approach. An automaton of the type shown in FIG. 3 may be constructed based on identifying the longest common prefixes and collapsing the prefixes. In an embodiment, links are labeled by the structural relationship of the element names labeling the nodes at the two ends of a link. In the example of FIG. 3, only one root node is provided; however, in practical embodiments multiple peer nodes normally exist, so that the automaton resembles a forest structure. Construction of an automaton in the approach herein may be extended to encapsulate more complex components of an XPath expression such as predicates.

Figure 4:
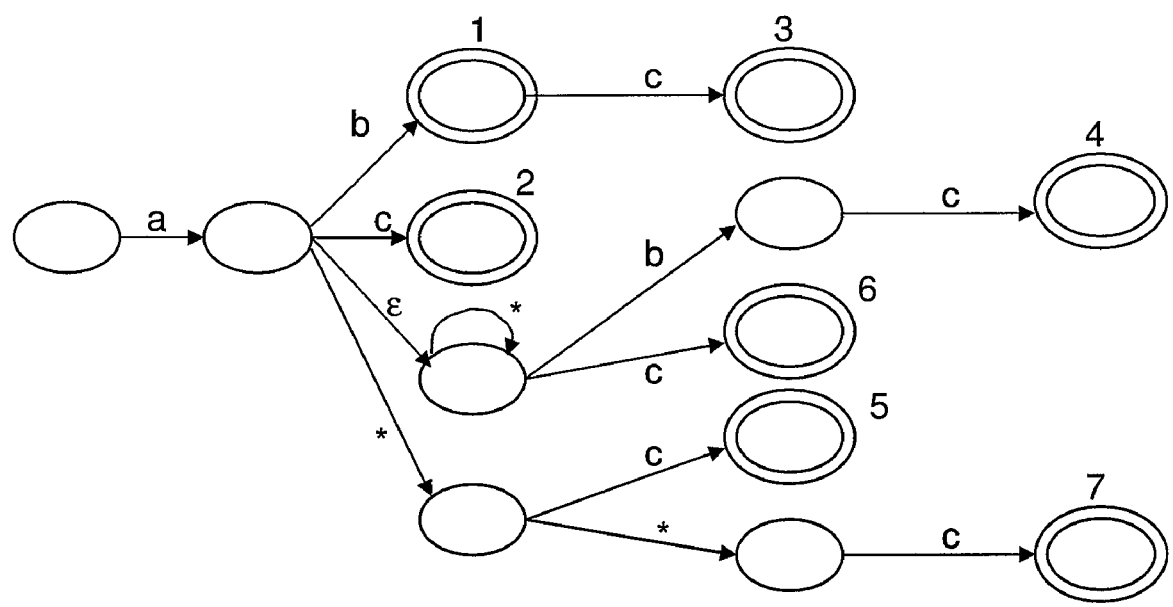
FIG. 4 illustrates an NFA corresponding to the same set S of XPaths as stated above and shown in FIG. 3.

An NFA-based approach is known as Yfilter and is described in Yanlei Diao et al., *Path Sharing and Predicate Evaluation for High-Performance XML Filtering*, ACM Transactions on Distributed Systems, December 2003. FIG. 4 illustrates an NFA corresponding to the same set S of XPaths as stated above and shown in FIG. 3. In FIG. 4, numeric values that are next to or on top of the final states in the NFA refer to the XPath indices. The automata used for FIG. 3 and FIG. 4 are distinctly different. For example, an XPA as in FIG. 3 is explicitly aware of the / (child of) and // (descendent of) structural operators, and this information is used at run-time. Second, there is no non-determinism in the XPA of FIG. 3, and consequently no null transitions. FIG. 3 also provides a look-ahead automata, a characteristic that is described in more detail below.

Construction of an XPA as in FIG. 3 for a set S of XPath comprises, in an embodiment, first normalizing the XPath expressions by inserting a // operator at the head of any expression that does not start with the operator /. For instance, an expression a/b/c becomes //a/b/c, but the expression /a/b/c remains unaltered.

For clarity, the following description ignores any predicates and constructs the automaton capturing only the structural relationships, and predicates are addressed later in the description. In an embodiment, the XPath expressions are sorted, ignoring the interior structural operators, but not the initial structural operators. The XPath expressions may be organized into a table similar to Table 2, in which each entity in the table is an element name together with its namespace qualifier. TABLE 3 presents an example of sorted Xpath expressions.

TABLE 3

EXAMPLE SORTED XPATH EXPRESSIONS

| A | b | | |
| a | b | c | |
| a | b | c | |
| a | c | | |
| a | c | | |
| a | * | c | |
| a | * | * | c |

In an embodiment, the process walks from left to right among the columns of the table and constructs two trees. The first tree is for the / operator, and the second tree is for the // operator. The roots of the two trees are labeled as / and // respectively. Alternatively, a dummy root node is generated at which the two trees are rooted.

All expressions starting with an / become the "scope" of the node representing that / (similarly for the //). In general, when the process is operating with the entity (i,j) in the table, with an element name x, and scope s in a tree t, the process examines all rows within s that have the same element name x in the column j and creates two nodes in t labeled x. The first node is for the operator / and the second is for the operator // if necessary. The process next creates as many child nodes of the / node as there are such rows in s where the next element is preceded by /. The // node is also treated similarly. The links from the / node are labeled by / and the links from the // node are labeled by //. When the end of an expression is reached, then the node labeled by the last element name in that expression is marked as a final state.

2.1.2.2 Extending the XPA to Include Predicates

Predicates in an XPath expression qualify a single element. For instance, an expression /a/b[P]/c is satisfied by an XML message X if /a/b/c is true for some a, b, c and that particular b also satisfies the predicate P. Processing expressions with predicates is complex, and most reported techniques treat predicate evaluation as a distinctly different problem from the structural relationships and use a post-processing step for predicate evaluation. For instance, to check if a given XML message satisfies the XPath expression /a/b[P]/c, one prior approach first computes the results of the expression /a/b/c, i.e., they capture all (a, b, c) such that /a/b/c in X, and then determines which of these b's also satisfy the predicate P. This approach is not well-suited to a streaming system, since the post-processing for predicates takes an unpredictable amount of resources, and may lead to unstable system behavior.

The difficulty of evaluating predicates in a streaming system arises from two aspects of predicates termed backward movement and non-local traversal. Backward movement may be described as follows. Beginnings of elements of a streaming XML message enter the system in the preorder (corresponding to the preorder traversal on the tree model of the message) and the ending of each element appears at the end of the subtree subtended at that element (in the tree model of the message). The sub-elements of an element appear in an arbitrary order within that element; thus, no intrinsic ordering exists among the children of a node in the tree model of the message. An example predicate is a[preceding-sibling of (parent)@attribute1=x], which means that the preceding sibling of the parent of "a" has an attribute "attribute 1", of value "x"). Such a predicate becomes impossible to evaluate without storing the entire message since if such a sibling exists, the sibling would have ended even before the parent of "a" has begun. Further, the system cannot determine when that particular sibling has appeared that its attribute1 attribute is needed for a predicate coming up later.

Non-local traversal may be described as follows. All descendents of an element "a" begin and end between the two events "beginning of a" and "end of a" of a streaming message X. Any traversal within the subtree at a node "a" "local" to "a" for this reason. Even without the backward movement described above, non-local traversal also causes difficulties in a streaming environment. An example expression is a[following-sibling@attribute1=x], which is qualifying an element "a" based on the attribute value of a sibling that will occur in the indeterminate future. Thus, in the worst case, the system may have to wait until receiving almost all of the message before determining whether or not this specific "a" qualifies.

Backward movement is addressed in an embodiment. In an embodiment, any XPath expression involving backward movement is converted into an equivalent expression that does not require any backward movement.

In an embodiment, non-locality is also addressed in a similar fashion. As an example, the above expression a[following-sibling@attribute1=x] can be re-written as: {*/a and (*/*@attribute1=x) and "comes first"}. Although this is no longer an XPath expression, the expression is still usable. Further, the equivalence of these expressions may be used to minimize the state information that needs to be maintained to evaluate such non-local traversal predicates.

In an embodiment, the XPA is configured to include predicates as follows. Assume that predicates do not involve any backward movement or non-local traversal. With these constraints, any predicate on an element "a" can be evaluated before the "end of element a" event occurs in a streaming XML message. Assume that two of the seven (7) expressions above have predicates as follows:

/a/b[c/d/f]

/a//b[d/*//e] [d/e/f]

Figure 5:
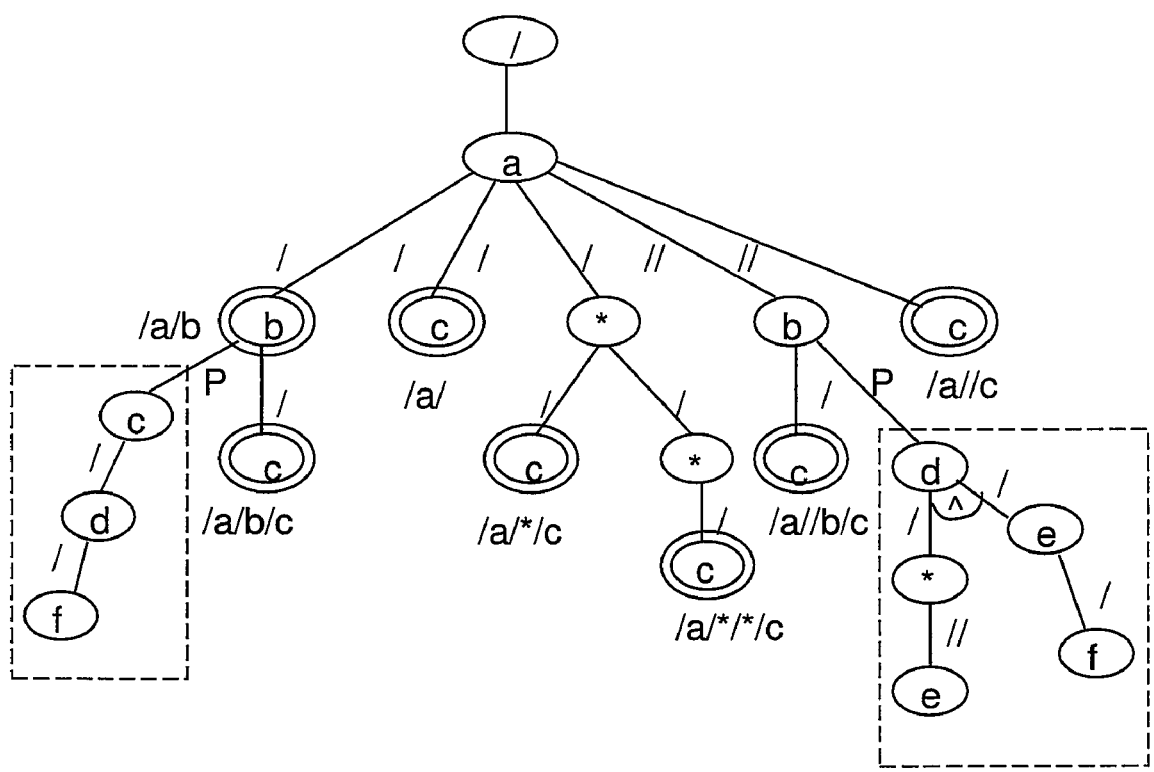
FIG. 5 illustrates the automaton of FIG. 3 enhanced with the predicate expressions shown above.

In an embodiment, a subtree is created in the XPA at each node with a predicate. The link from that node to the root of the subtree is labeled "P" to indicate that it is a predicate subtree. Since predicates can have logical and other aggregation operators (either explicit or implicit), the results of two or more branches of the subtree may have to be combined in some fashion. Such combining is indicated by aggregating the corresponding links and labeling the aggregation by the aggregation operator. FIG. 5 illustrates the automaton of FIG. 3 enhanced with the predicate expressions shown above. As indicated above regarding non-local traversals, relationships between branches of a predicate subtree, such as one branch having to occur before another, are also treated as aggregate operators.

2.2 Runtime Processing

The preceding description addresses constructing logical data structures by pre-processing a given set S of XPath expressions. The following sections describe how the data structures are utilized at run-time to process a streaming XML message and determine which of the XPath expressions are satisfied by that message.

2.2.1 Tokenization

The wire format of an XML message comprises a serialized version of the message's hierarchical structure, in which the beginnings of nodes appear in the preorder and the endings appear at the end of the subtree subtended at a node. TABLE 4 presents an example.

TABLE 4

EXAMPLE XML DOCUMENT

```
<?xml version="1.0"?>
<catalog>
    <book id="bk101">
        <author>Gambardella, Matthew</author>
        <title>XML Developer's Guide</title>
        <genre>Computer</genre>
        <price>44.95</price>
        <publish_date>2000-10-01</publish_date>
        <description>An in-depth look at creating
        applications with XML.</description>
    </book>
    <book id="bk102">
        <author>Ralls, Kim</author>
        <title>Midnight Rain</title>
        <genre>Fantasy</genre> <price>5.95</price>
        <publish_date>2000-12-16</publish_date>
        <description>A former architect battles corporate
```

TABLE 4-continued

EXAMPLE XML DOCUMENT zombies, an evil sorceress, and her own childhood to become queen of the world.</description>
    </book>
</catalog>

The wire format appearance of this message, from left to right, is stated in TABLE 5.

TABLE 5

EXAMPLE WIRE-FORMAT MESSAGE

<?xml version="1.0"?> <catalog> <book id="bk101">
<author>Gambardella, Matthew</author> <title>XML Developer's Guide</title> <genre>Computer</genre> <price>44.95</price> <publish_date>2000-10-01</publish_date> <description>An in-depth look at creating applications with XML.</description> </book>
<book id="bk102"> <author>Ralls, Kim</author> <title>Midnight Rain</title> <genre>Fantasy</genre> <price>5.95</price> <publish_date>2000-12-16</publish_date> <description>A former architect battles corporate zombies, an evil sorceress, and her own childhood to become queen of the world.</description> </book> </catalog>

In an embodiment, a streaming XPath processing engine (XPE) receives chunks of the message and logically reconstructs the original hierarchical structure, without necessarily holding the entire hierarchy or even substantial parts of the hierarchy at any time during the process. Instead, the processing engine only maintains as much state information as necessary to evaluate the XPath expressions.

As discussed earlier, one of the first tasks is to identify the entities of interest. Since these entities are of different types, such as elements, attributes, namespaces, text values, etc., the process must also need to identify their type. Performing type identification requires contextual state information, such as the fact that an attribute can occur only within the direct scope of an element begin, as in the element:

<book id="bk102">

In this example, "id" is an attribute name that occurs within the < . . . > where the element name "book" appears. In other words, if we capture the content between < . . . > when an element begins, then it not only contains the element name but also any attributes that element has, together with their values. The value of the element itself may or may not occur this early; it may in fact be interleaved across the element's children.

In an embodiment, a first step in the XPE processing is to capture the contents between the various delimiters—<, space, :, =, > and line feeds. In an embodiment, a processing method uses a DFA that scans for a "<" and then captures the characters up to and between any other delimiters that occur before the first ">" is encountered. Thus, for instance in the above example, the entities captured are:

Book
    Id
    "bk102"

Figure 6:
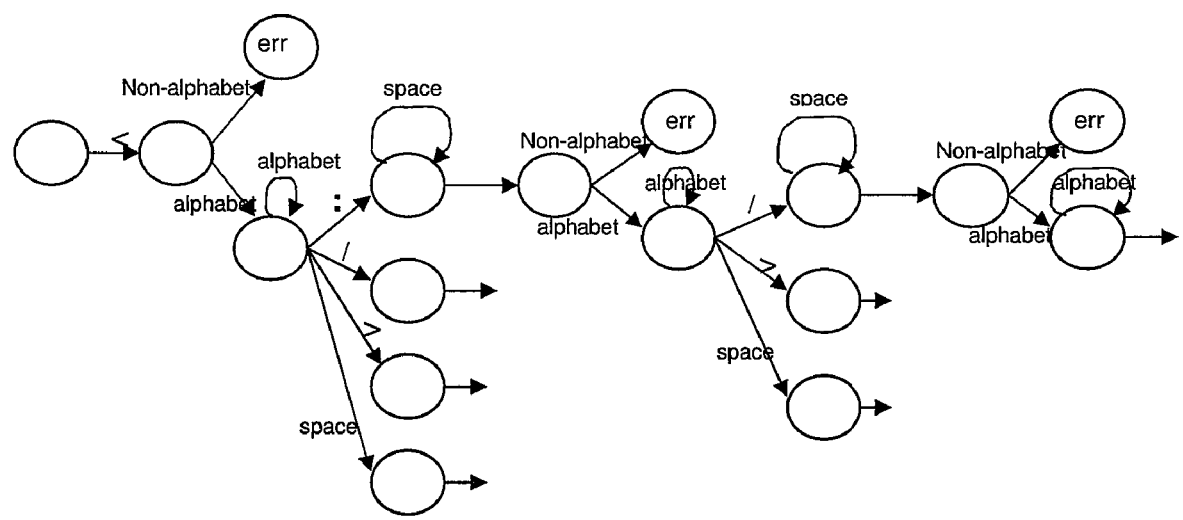
FIG. 6 illustrates a segment of an example DFA, corresponding to a common pattern of occurrence, of the type given in the above example.

The process also identifies the type of each of the captured entities. The entity appearing immediately next to "<" is the element name; if there is a colon character (":") after the first entity, then the first entity is the namespace and the next entity after the colon character is a local name of the element. FIG. 6 illustrates a segment of an example DFA, corresponding to a common pattern of occurrence, of the type given in the above example.

When an entity is captured, the entity is provided to the Name Recognition Engine (NRE), which determines whether the name is of interest to the XPath expressions. The output from the NRE, if the name is of interest, is the numeric value that was assigned to that name during the pre-processing of the XPath expressions.

In an embodiment, the NRE maintains a Namespace Stack (NSS) that tracks the namespace scope. The top of the stack indicates the namespace of the current element. In an embodiment, the namespace of an element without an explicit namespace association is that of its closest ancestor with a declared namespace. Each namespace is placed on the top of the stack when it is explicitly associated with an element name. A namespace is removed from the stack when that element ends. The wire format of well-formed XML messages assures that the namespace at the top of the stack is that of the element that ends.

2.2.2 Operation of XPath Automaton (XPA) with Look-Ahead Approach

The XPath Automaton (XPA) then receives the numeric value corresponding to the name of interest and the type of that name. The type is determined from the DFA state where the entity was captured, or in the next state, as in the case of an element name.

The XPA has a set of "active" states during its operation. When a new XML message starts, the XPA is in the initial state as its only active state. In addition to the active states, the XPA looks ahead to determine the next set of states and the labels of those states. Information about the next set of states and the labels of those states is provided as feedback into the NRE. Therefore, when matching a just-captured entity against the table of names of interest, the process determines if the entity is in that table, and also if the entity is among the state labels given by the XPA. Thus, when the NRE determines an entity as of interest, a state transition in the XPA necessarily follows.

The look-ahead used in the XPA is different from the concept used in look-ahead grammars that examine the next k input symbols. In the present approach, look-ahead refers to determining the next set of state transitions.

In an embodiment, the next set of states is determined using the following approach. Let R be the set of currently active states. A state in R may have some /-transitions and some //-transitions. For each /-transition, the process collects the state it is transitioning into. For each //-transition, the process collects the state it is transitioning into as well as the current state. In other words, all currently active states with //-transitions are placed into the set of next states, together with the states they are transitioning to, while the currently active states with only /-transitions are not. The labels of the states in this set of next states are the entities of interest at the present time.

In an embodiment, the XPA implements a set of transition rules. In an embodiment, when a captured entity is determined to be of interest to the XPA, each of the transitions (whether it is a /-transition or a //-transition) where the new state is labeled by that entity is made, and each of these states is placed into the "currently active states" set. In addition, for each //-transition, the state from which the transition is made is also placed into this set, with the marking that its next state transitions will be only //-transitions.

In an embodiment, the XPA is configured with suspended state processing logic. In an embodiment, the suspended state processing logic is configured so that when a state in the currently active set is not placed in the next set of active states, the state is placed into the set of suspended states, together with the name of the entity just received, except under one condition that is described below. The use of the suspended state processing logic may be understood using the following example XPath expression: a/b Assume that the currently active state is labeled with "a", and therefore the only entity of interest in this state is an element, of name "b". Assume that the entity most recently received is an element with the name "c". Since "c" is not an entity of interest in this state, this state (with label "a") is placed into the suspended state set, together with the name "c". The state remains suspended until the end of the element "c" and then the suspended state is returned to active status, except if the end of element "a" is reached.

Thus, the events of interest to the XPA can be summarized as: beginnings of elements whose names label the next states, and endings of elements labeling the suspended states and the elements associated with the suspended states (like the element "c" in the above example). The rules for movement out of suspension can be summarized as: if the element labeling a suspended state ends, then that state is dropped, and if the element associated with a suspended state ends, then that state is placed back into the set of active states.

Figure 7:
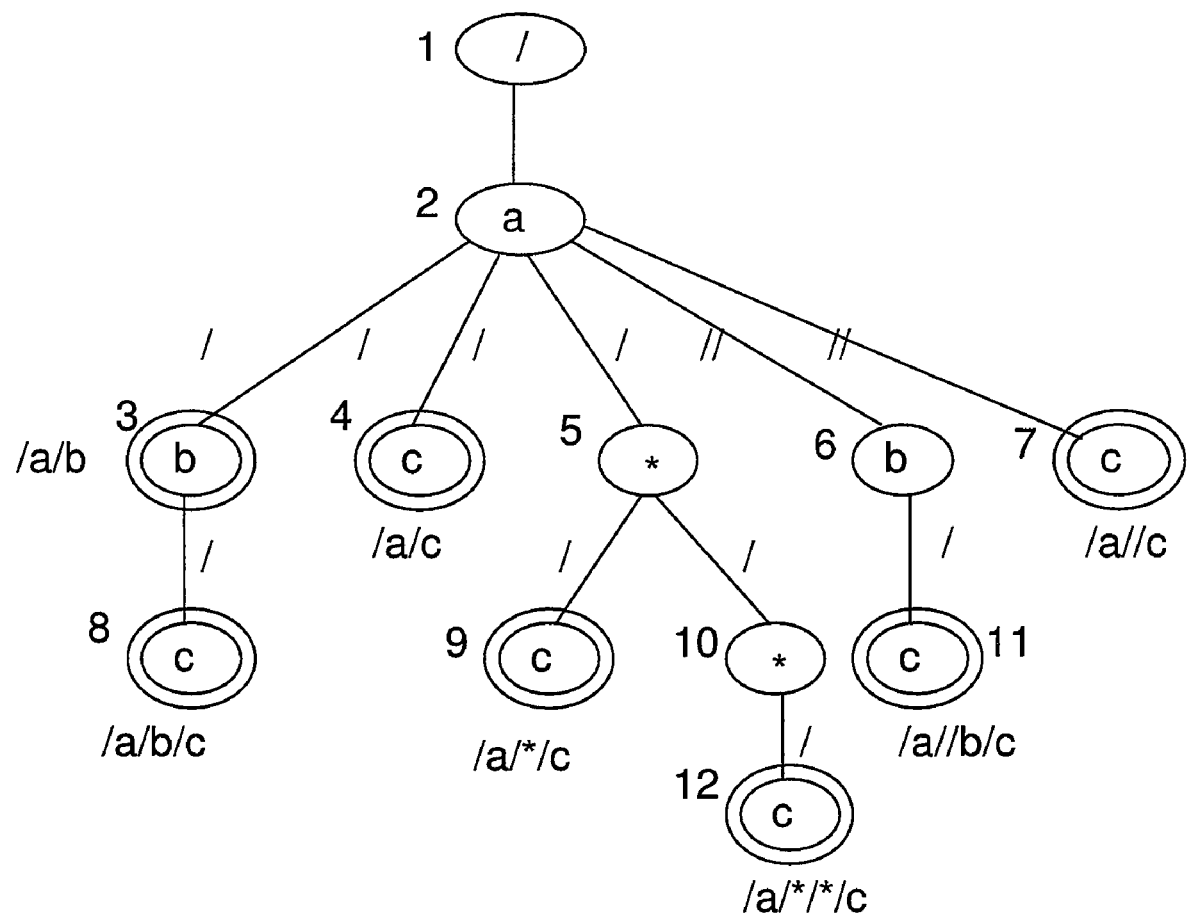
FIG. 7 illustrates the automaton of FIG. 5 with numbers assigned to states.

An example of how an XPA operates on a sample XML message is now provided with reference to FIG. 7, TABLE 6, and TABLE 7. FIG. 7 illustrates the automaton of FIG. 5 with numbers assigned to states. TABLE 6 provides an example XML message in which all details except the beginning and end of elements have been removed for clarity.

TABLE 6

EXAMPLE XML MESSAGE

```
<a>
    <g>
        <c>
        </c>
        <d>
        </d>
    </g>
    <c>
    </c>
    <b>
        <d>
        </d>
        <c>
        </c>
    </b>
</a>
```

TABLE 7 shows values of an active state set, next state set, labels, and suspended state set as the contents of the sets change when the XPA processes the message of TABLE 6 and in response to successive events occurring as a text stream of the message arrives.

TABLE 7

TRANSITIONS IN VALUES OF XPA STATES

| Event | Active States | Next States | Suspended States |
|---|---|---|---|
| Startup | 1 | 2 | NULL |
| begin "a" - matches with the label of 2 | 2 | {3, 4, 5, 6, 7}; labels: {b, c, *} | {1 (a)} /// state 1 can be revived at the end of element a |
| begin "g" - matches with the label (*) of state 5. | 5 | {9, 10}; labels: {c, *} | {1 (a), 2 (g)} |
| begin "c" - matches with labels of states 9, 10 | 9, 10 (9 is a final state) | {12}; labels: {c} | {1 (a), 2 (g), 5 (c)} |
| end of "c" - matches with the suspended state 5 | {5} /// state 10 is dropped since the next state is labeled "c", which did not begin | {9, 10}; labels: {c, *} | {1 (a), 2 (g)} |
| begin "d" - matches with label of 10 | 10 | {12}; labels: {c} | {1 (a), 2 (g), 5 (d)} |
| end of "d" - matches with the suspended state 5 | 5 | {9, 10}; labels: {c, *} | {1 (a), 2 (g)} |
| end of "g" - matches with the suspended state 2 | 2 | {3, 4, 5, 6, 7}; labels: {b, c, *} | {1 (a)} |
| begin "c" - matches labels for states 4, 5, 7 | {4, 5, 7, 2(//-only)} - 4, 7 are final states | {9, 10, 7}; labels: {c, *} | {1 (a), 2 (c)} |
| end of "c" - matches with the suspended state 2 | 2 | {3, 4, 5, 6, 7}; labels: {b, c, *} | {1 (a)} |
| begin "b" - matches with labels for states 3, 5, 6 | {3, 5, 6, 2(//-only)} - 3 is a final state | {8, 9, 10, 11, 7}; labels: {c, *} | {1 (a), 2 (b)} |
| begin "c" - matches with labels for states 8, 9, 10, 11, 7 | {8, 9, 10, 11, 7, 2(//-only)} - 8, 9, 11, 7 are final states | {12, 7}; label: {c} | {1 (a), 2 (b), 3 (c)} |
| end of "c" - matches with the suspended state 3 | 3 | {8}; label: {c} | {1 (a), 2 (b)} |
| end of "b" - matches with the suspended state 2 | 2 | {3, 4, 5, 6, 7}; labels: {b, c, *} | {1 (a)} |
| end of "a" - matches | 1 | 2 | NULL |

TABLE 7-continued

TRANSITIONS IN VALUES OF XPA STATES

| Event | Active States | Next States | Suspended States |
|---|---|---|---|
| with the suspended state 1 End of message | | | |

In this example, operation of the XPA matches several expressions:

/a/*/c (twice)

/a/c

/a//c

/a/b

/a/b/c

/a//b/c

The only expression not satisfied is /a/*/*/c.

2.4.4 Predicates and Aggregation

As shown above, while the paths in an XPA for predicate-free expressions are independent of each other, the subpaths in a predicate can be related by aggregators. Fortunately, most aggregators are incrementally computable, so that the result of each path can be consumed immediately, without having to wait until all other paths are also completed. Thus, predicate processing in our approach can logically be thought of as the run-time processing of the XPA, together with aggregation functions that take the results of the XPA processing for predicate subpaths and aggregate them.

2.3 Alternative Embodiments

2.3.1 Alternatives for Name Recognition Engine (NRE)

In an embodiment, the Name Recognition Tree (NRT) includes length information at each node, for all the names occurring at the leaves of the subtree at that node. Thus, when a new entity is captured, and the process is evaluating a node in the NRT to compare a character in the entity string with the label of the node, the process first checks if the length of the entity matches. This alternative can be effective when the NRT size is large and the names in the table have varying lengths.

In an embodiment, the feedback loop from the XPA to the NRE described above marks the leaf nodes in NRT (i.e., the names) as labeling the "next states" in XPA processing when they so do. In an embodiment, this information is propagated up the NRT. In general, the process marks a node if one of its children is marked. Thus, the root of a subtree is marked only if at least one of the leaf nodes in that subtree is marked by the XPA feedback mechanism. IN this alternative, the process can determine if a new entity is of interest at each node where its characters are being compared, and can stop further matching if an unmarked node is reached. This alternative can be effective when the NRT is wide and deep, i.e., has 4 or more layers and 4 or more children at each internal node.

In a well-formed XML message, the element name in an end of element event must be identical to the element name in the corresponding beginning of element event. In an embodiment, if the process has determined that an incoming XML message is well-formed, then the process does not have to run the name in an end of element event through the NRT at all.

2.3.2 Alternatives for XPath Automaton (XPA)

In an embodiment, caching next states is implemented in the XPA logic. In some embodiments, finding the next state set following an event is a computationally expensive process. In an embodiment, two levels of caching are used to reduce the overall cost of computing the next state sets. In a first level of global caching, multiple simultaneous XML messages can "share" the next state information, since a large number, if not all, of the XML messages processed use the same XPA. Thus, it is likely that when an event for a message m matches on the label of a state s, there is another concurrent message that just made the same transition. In this case, information is shared by not making the transition for each of the messages but instead simply copying the state information of one to the other implicitly.

In an embodiment, a second level of caching comprises re-using the next state information. One rationale is that when a state is suspended and then revived again, the next states from that state do not change. Therefore, in an embodiment, the process stores in the suspended states table not only the states and the labels they are waiting on, but also the next states. Accordingly, when a state is revived later, the process revives the information on its next states as well.

Figure 8:
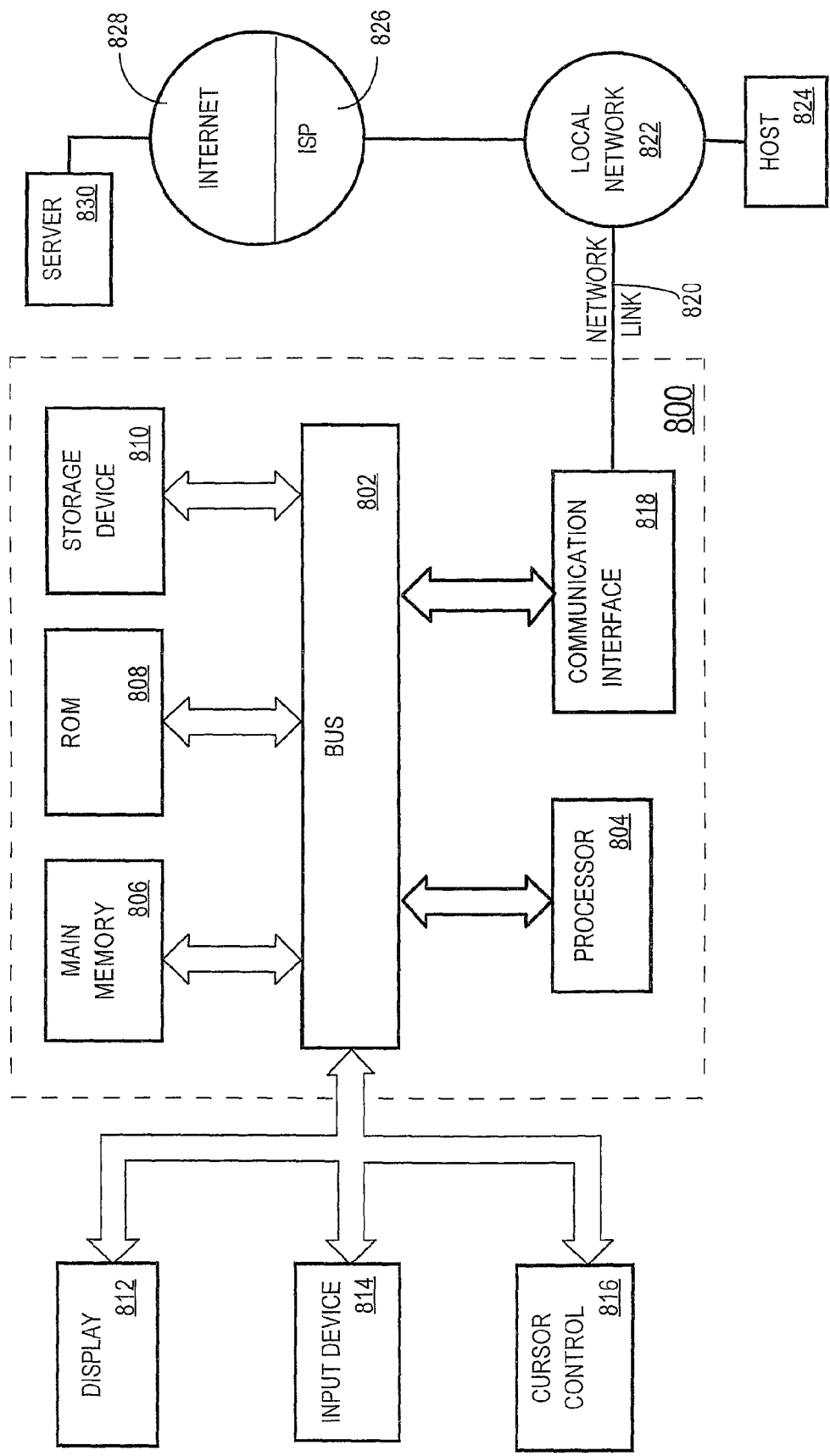
FIG. 8 illustrates a computer system with which an embodiment can be implemented.

FIG. 8 illustrates a computer system with which an embodiment can be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 800, various machine-readable media are involved, for example, in providing instructions to processor 804 for execution. Such a medium may take many forms, including but not limited to, non-volatile storage media, volatile storage media, and transmission media. Non-volatile storage media includes, for example, optical or magnetic disks, such as storage device 810. Volatile storage media includes dynamic memory, such as main memory 806. Transmission media includes coaxial cables, copper wire and fiber optics, including the wires that comprise bus 802.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector can receive the data carried in the infrared signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution. In this manner, computer system 800 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

We claim:

1. A data processing system, comprising:
  a token processor configured to receive data comprising a structured electronic document in serialized format and to identify one or more entities in the data;
  a name recognition engine configured to recognize one or more names of elements of the structured electronic document and to recognize one or more names of attributes of the elements;
  a finite state automaton comprising states and transitions representing structural relationships among elements and attributes of one or more structured path expressions and state look-ahead logic that is configured to determine one or more active states of the automaton and one or more next states of the automaton;
  logic encoded in one or more computer-readable storage media for execution and when executed by one or more processors operable to cause:
    receiving at the token processor one or more messages comprising the structured electronic document in serialized format;
    identifying, at the token processor, one or more entities in the one or more messages;
    determining, at the name recognition engine, whether at least one entity of the one or more entities corresponds to at least one of the one or more next states of the automaton;
    sending to the automaton, from the name recognition engine, the at least one entity when the at least one entity corresponds to at least one of the one or more next states of the automaton;

the automaton performing, based on the at least one entity, one or more state transitions resulting in reaching a final state of the automaton;

outputting the final state of the automaton;

wherein the name recognition engine comprises a data table and a tree;

wherein the tree comprises a root node corresponding to a character position in names of elements or attributes in the structured electronic document;

wherein the logic is further configured to walk the tree to seek a match for a name of a specified entity among the one or more entities, by:

selecting a letter in a position specified by a label of the root node and comparing the selected letter to other letters that label links to a child node;

determining that a specified entity's name is of no interest if the specified entity's name matches none of the other letters;

traversing a link labeled by the letter when there is a match;

upon reaching a leaf node, comparing all remaining letters and determining a match.

2. The system of claim 1 wherein the logic is further configured to instruct the token processor to cease processing a particular portion of one of the messages when the one or more next states indicate that the particular portion cannot match any one of the structured path expressions.

3. The system of claim 1 wherein the structured electronic document is an extensible markup language (XML) document and wherein the structured path expressions are XPath expressions.

4. The system of claim 1, wherein rows in the data table correspond to the names of elements or attributes in the structured electronic document, wherein columns in the data table correspond to characters of the names, wherein a column rank of each column comprises a maximum number of times that one of the characters occurs in that column, wherein the root node is associated with one of the columns having a lowest column rank.

5. The system of claim 1 wherein the transitions of the automaton correspond to "child of" and "descendent of" structural operators in the structured electronic document.

6. The system of claim 1 wherein the automaton comprises one or more branches corresponding to predicates within the structured path expressions.

7. The system of claim 1 wherein the automaton comprises a tree having a sub tree corresponding to a predicate within one of the structured path expressions, wherein the sub tree is rooted at a node with the predicate.

8. The system of claim 7 wherein the sub tree comprises a plurality of branches corresponding to conditions of the predicate, wherein the branches are associated with an aggregation operator representing how to combine the conditions of the predicate.

9. A non-transitory computer-readable storage medium having encoded thereon:

token processor logic which, when executed by one or more processors, is operable to receive data comprising a structured electronic document in serialized format and to identify one or more entities in the data;

name recognition engine logic when executed by the one or more processors is operable to recognize one or more names of elements of the structured electronic document and to recognize one or more names of attributes of the elements;

finite state automaton logic comprising states and transitions representing structural relationships among elements and attributes of one or more structured path expressions and state look-ahead logic when executed by the one or more processors is operable to determine one or more active states of the automaton and one or more next states of an automaton;

processing logic which, when executed by the one or more processors, is operable to cause:

receiving at a token processor one or more messages comprising the structured electronic document in serialized format;

identifying, at a token processor, one or more entities in the one or more messages;

determining, at a name recognition engine, whether at least one entity of the one or more entities corresponds to at least one of the one or more next states of the automaton;

sending to the automaton, from the name recognition engine, the at least one entity when the at least one entity corresponds to at least one of the one or more next states of the automaton;

the automaton performing, based on the at least one entity, one or more state transitions resulting in reaching a final state of the automaton;

outputting the final state of the automaton;

wherein the name recognition engine logic, when executed by the one or more processors, is further operable to cause generating a data table and a tree;

wherein the tree comprises a root node corresponding to a character position in names of elements or attributes in the structured electronic document;

wherein the processing logic, when executed by the one or more processors, is further operable to cause walking the tree to seek a match for a name of a specified entity among the one or more entities by: selecting a letter in a position specified by a label of the root node and comparing the selected letter to other letters that label links to a child node; determining that a specified entity's name is of no interest if the specified entity's name matches none of the other letters; traversing a link labeled by the letter when there is a match; comparing all remaining letters and determining a match upon reaching a leaf node.

10. The computer-readable storage medium of claim 9 wherein the processing logic is further configured to instruct the token processor to cease processing a particular portion of one of the messages when the one or more next states indicate that the particular portion cannot match any one of the structured path expressions.

11. The computer-readable storage medium of claim 9 wherein the structured electronic document is an extensible markup language (XML) document and wherein the structured path expressions are XPath expressions.

12. The computer-readable storage medium of claim 9, wherein rows in the data table correspond to the names of elements or attributes in the structured electronic document, wherein columns in the data table correspond to characters of the names, wherein a column rank of each column comprises a maximum number of times that one of the characters occurs in that column, wherein the root node is associated with one of the columns having a lowest column rank.

13. The computer-readable storage medium of claim 9 wherein the transitions of the automaton correspond to "child of" and "descendent of" structural operators in the structured electronic document.

14. The computer-readable storage medium of claim 9 wherein the automaton comprises one or more branches corresponding to predicates within the structured path expressions.

15. The computer-readable storage medium of claim 9 wherein the automaton comprises a tree having a sub tree corresponding to a predicate within one of the structured path expressions, wherein the sub tree is rooted at a node with the predicate.

16. The computer-readable storage medium of claim 15 wherein the sub tree comprises a plurality of branches corresponding to conditions of the predicate, wherein the branches are associated with an aggregation operator representing how to combine the conditions of the predicate.

17. A data processing apparatus, comprising:
means for receiving an XML document in serialized format and for identifying one or more entities in the XML document;
means for recognizing one or more names of elements of the XML and for recognizing one or more names of attributes of the elements;
finite state automaton means comprising states and transitions representing structural relationships among elements and attributes of one or more structured path expressions and comprising look-ahead means for determining one or more active states of the automaton and one or more next states of the automaton;
means for receiving, at a token processor, one or more messages comprising a structured electronic document in serialized format;
means for identifying, at the token processor, one or more entities in the one or more messages;
means for determining, at a name recognition engine, whether at least one entity of the one or more entities corresponds to at least one of the one or more next states of the automaton;
means for sending to the automaton, from the name recognition engine, the at least one entity when the at least one entity corresponds to at least one of the one or more next states of the automaton;
means for performing at the automaton, based on the at least one entity, one or more state transitions resulting in reaching a final state of the automaton;
means for outputting the final state of the automaton;
wherein the recognizing means further comprises means for generating a data table and a tree;
wherein the tree comprises a root node corresponding to a character position in names of elements or attributes in the structured electronic document;
means for walking the tree to seek a match for a name of a specified entity among the one or more entities;
means for selecting a letter in a position specified by a label of the root node and comparing the selected letter to other letters that label links to a child node;
means for determining that a specified entity's name is of no interest if the specified entity's name matches none of the other letters;
means for traversing a link labeled by the letter when there is a match;
means for comparing all remaining letters and determining a match upon reaching a leaf node.

18. The apparatus of claim 17, wherein rows in the data table correspond to the names of elements or attributes in the structured electronic document, wherein columns in the data table correspond to characters of the names, wherein a column rank of each column comprises a maximum number of times that one of the characters occurs in that column, wherein the root is associated with one of the columns having a lowest column rank.

* * * * *